UNITED STATES PATENT OFFICE.

ERNEST BENTZ, OF MANCHESTER, ENGLAND, ASSIGNOR TO BADISCHE ANILIN & SODA FABRIK, OF LUDWIGSHAFEN-ON-THE-RHINE, GERMANY, A CORPORATION.

PRODUCTION OF RESERVE EFFECTS ON TEXTILE FIBER.

1,098,145. Specification of Letters Patent. Patented May 26, 1914.

No Drawing. Application filed May 20, 1911. Serial No. 628,590.

*To all whom it may concern:*

Be it known that I, ERNEST BENTZ, technical chemist, subject of the King of Great Britain and Ireland, residing at 30 Manley road, Whalley Range, Manchester, in the county of Lancaster, England, have invented new and useful Improvements in the Production of Reserve Effects on Textile Fiber, of which the following is a specification.

In the specification of application for Letters Patent Serial No. 584,299 is described the production of discharge effects on fiber which has been dyed with a vat coloring matter or with a sulfur coloring matter, the processes there claimed being characterized by the addition to the discharging paste of a compound containing an aralkyl residue, the said compound being capable of parting with the aralkyl residue so that this latter can combine with a leuco compound of a vat coloring matter or of a sulfur coloring matter. According to the aforesaid specification the aralkyl residue may contain a group capable of forming a salt either in the free form or otherwise.

I have now found that the said aralkyl compounds are excellently adapted for use in the production of reserve effects under vat coloring matters under which term I also include sulfur coloring matters, and I prefer to carry out the process of this invention by applying to the material a reserve paste containing such aralkyl compound and then printing or padding the material thus prepared with a paste containing a coloring matter and a suitable reducing agent, such for instance as sodium formaldehyde sulfoxylate and glucose. If desired, the aralkyl compound can be used in conjunction with other compounds which act as reserves, for instance with acids or with oxidizing bodies or with mechanical reserving materials.

When employing an aralkyl compound containing a group capable of forming a salt attached to the aralkyl residue, compounds of the leuco coloring matter with the aralkyl residue are produced which are easily soluble in water and can thus readily be removed from the fiber. In this way white reserve effects can be obtained. If, however, the aralkyl residue contain no such group capable of forming a salt, and the coloring matter which it is desired to reserve consists of indigo, or the like, a yellow compound insoluble in dilute alkalis is generally produced and under some conditions this yellow compound may become fixed on the fiber and yellow reserve effects on a blue ground thus be obtained. The reserve, or resist, paste may be printed by itself, or side by side in fitting patterns with other suitable printing colors so as to vary the effects obtained. The textile fabrics may be printed with the resists and may be padded or cover-printed in one and the same operation, instead of being printed with the resists and dried and afterward padded or cover-printed and dried in a separate operation.

My method or process is applicable to textile fabrics or goods composed of cotton, linen, wool, silk, artificial silk, and mixtures of such fibers, and the composition of the reserve, or resist, paste will be varied in accordance with the nature of the fiber, the properties of the coloring matter or dyestuff and the composition of the color mixture.

The following examples will serve to illustrate further the nature of my invention, which, however, is not confined to these examples.

Example 1: Print on material which has previously been prepared with glucose a paste containing eighty grams of a fifty per cent. gum solution and twenty grams of the calcium salt of the disulfonic acid obtainable from dimethyl-phenyl-benzyl-ammonium chlorid, and dry at ordinary temperature. Then pad the material with a paste containing from fourteen to fifteen grams of indigo pure BASF. twenty per cent. and from eighty-five to ninety grams of alkaline thickening. Then dry, steam for one minute, develop in running water, and finally acidify. The alkaline thickening used in this example is obtained from sixty grams of dark burnt starch in sixty grams of water, thirty grams of wheat starch in thirty grams of water, and four hundred cubic centimeters of forty-one per cent. caustic soda solution. Corresponding methods can be employed when using other aralkyl compounds and when reserving other vat, or sulfur, coloring matters.

Example 2: Prepare a paste from one and one-tenth liter of forty per cent. British gum thickening, six hundred and eighty grams of dimethyl-phenyl-benzyl-ammonium chlorid and one and one-tenth liter of water. This is suitable for printing on cotton goods or fabrics which are afterward padded or cover-printed with color mixtures containing a suitable vat coloring matter, such as brilliant indigo BB.

Example 3: Prepare a paste from one and one-tenth liter of forty per cent. British gum thickening, four hundred and fifty grams of dimethyl-phenyl-benzyl-ammonium chlorid, four hundred and fifty grams of ammonium chlorid and one and one-tenth liter of water. This resist paste is suitable for printing on goods which are subsequently padded or cover-printed with indigoid dyestuffs or with indanthrene dyes.

Example 4: Mix together and then boil four kilos of the sodium salt of the disulfonic acid obtainable from dimethyl-phenyl-benzyl-ammonium chlorid, ten kilos of water, one kilo of zinc oxid and four kilos of British gum.

Example 5: Dissolve four kilos of lead acetate in seven and a half kilos of water and add a hot solution of one and a half kilo of dimethyl-phenyl-benzyl-ammonium chlorid in two and a half kilos of water. After cooling, filter off the lead chlorid which has separated out, and then thicken the clear solution by heating it with five kilos of British gum. This paste is suitable for producing yellow resist effects, it being necessary that the material be chromed after being treated with the vat coloring matter or the like.

Example 6: Dissolve one and a half kilogram of dimethyl-phenyl-benzyl-ammonium chlorid in four and a half liters of an alizarin red printing mixture of the usual composition, preferably containing, in addition to the alizarin and other essential ingredients, the oil-preparation known as "Lizarol D", or similar oil compound.

Example 7: Dissolve one and a half kilo of dimethyl-phenyl-benzyl-ammonium chlorid in ten liters of an ordinary azo claret printing color, prepared by diazotizing alpha-naphthylamin and adding sodium acetate or analogous compound, and suitably thickening the mixture. This paste is printed upon cotton fabrics prepared with an alkaline solution of beta-naphthol. The fabrics are thereupon padded or cover-printed with appropriate vat color, or sulfur coloring matter mixtures. The subsequent operations comprise steaming, washing or chroming and soaping.

Example 8: For a pigment green reserve, dissolve one and a half kilo of dimethyl-phenyl-benzyl-ammonium chlorid in ten liters of a mixture prepared from twelve kilos of pigment green, one and a quarter liter of glycerin, and ten liters of a thirty per cent. blood albumin solution.

My process is capable of extensive variations and enables the obtainment of a number of new and useful reserve effects which cannot be obtained by the older process. It also permits the use of certain vat colors which, so far as I am aware, have not hitherto been successfully applied. Even in the production of effects which can be obtained by the older process, my process offers certain technical advantages, for instance, in obtaining reserve effects on plain grounds it obviates the necessity for previous dyeing, since the fixation of the coloring matter and the production of the reserve effects take place simultaneously.

Now what I claim is:—

1. The production of resist effects by printing upon textile goods or fabrics a reserve paste consisting essentially of a compound containing an aralkyl residue and subsequently applying to the said goods a color mixture consisting essentially of a suitable vat coloring matter with the admixture of assistants adapted to promote the fixation of the vat coloring matter on the fiber, substantially as hereinbefore described.

2. The production of colored reserve effects by printing upon textile goods or fabrics a reserve paste consisting essentially of a compound containing an aralkyl residue suitably thickened, with the addition of suitable coloring matters with the assistants, if any, necessary for their fixation upon the fiber and subsequently applying to the said goods a color mixture consisting essentially of a suitable vat coloring matter with the admixture of assistants adapted to promote the fixation of the coloring matter on the fiber, substantially as hereinbefore described.

3. The production of colored reserve effects by printing upon textile goods or fabrics a reserve paste consisting essentially of a compound containing an aralkyl residue suitably thickened, with the addition of certain salts capable of acting as mordants, and subsequently applying to the said goods a color mixture consisting essentially of a suitable vat color with the admixture of assistants adapted to promote the fixation of the coloring matter on the fiber, and finally dyeing substantially as hereinbefore described.

4. The production of resist effects by printing upon textile goods or fabrics previously prepared with an alkaline beta-naphthol solution a reserve paste consisting essentially of a compound containing an aralkyl residue suitably thickened, with the addition of a suitable diazo solution and subsequently applying to the said goods a color mixture consisting essentially of a vat coloring matter, with the addition of assistants adapted to promote the fixation of the vat coloring matter on the fiber, substantially as hereinbefore described.

In testimony whereof I have hereunto set my hand in the presence of two subscribing witnesses.

ERNEST BENTZ.

Witnesses:
  JOHN WILLIAM THOMAS,
  MALCOLM SMETHURST.